(12) United States Patent
Whittle et al.

(10) Patent No.: US 11,536,205 B2
(45) Date of Patent: Dec. 27, 2022

(54) GAS TURBINE ENGINE OPERATING SCHEDULES FOR OPTIMIZING CERAMIC MATRIX COMPOSITE COMPONENT LIFE

(71) Applicant: Rolls-Royce plc, London (GB)

(72) Inventors: Michael J. Whittle, London (GB); Ian M. Edmonds, London (GB); Stephen Harris, London (GB)

(73) Assignee: Rolls-Royce plc

( * ) Notice: Subject to any disclaimer, the term of this patent is extended or adjusted under 35 U.S.C. 154(b) by 374 days.

(21) Appl. No.: 16/835,942

(22) Filed: Mar. 31, 2020

(65) Prior Publication Data

US 2021/0301737 A1 Sep. 30, 2021

(51) Int. Cl.
*F02C 9/00* (2006.01)
*F02C 7/12* (2006.01)
(Continued)

(52) U.S. Cl.
CPC .............. *F02C 9/00* (2013.01); *F01D 21/003* (2013.01); *F02C 7/12* (2013.01); *F02C 9/54* (2013.01); *F01D 5/282* (2013.01); *F01D 5/284* (2013.01); *F05D 2260/80* (2013.01); *F05D 2260/81* (2013.01); *F05D 2260/941* (2013.01);
(Continued)

(58) Field of Classification Search
CPC ...... F02C 7/12; F02C 9/00; F02C 9/28; F02C 9/54; G05B 23/024; F05D 2270/11; F05D 2270/112; F05D 2270/114; F05D 2260/941; F05D 2300/6033; F01D 21/003; F01D 25/08; F01D 5/282; F01D 5/284
See application file for complete search history.

(56) References Cited

U.S. PATENT DOCUMENTS 4,625,510 A * 12/1986 Evans ...................... F02C 9/28
60/39.282
4,767,259 A 8/1988 Kurosawa et al.
(Continued)

FOREIGN PATENT DOCUMENTS

EP 2937522 A1 10/2015
EP 3208442 A1 8/2017

OTHER PUBLICATIONS

European Official Action dated Jun. 14, 2021 and issued in connection with European Patent Application No. 21161731.1.

*Primary Examiner* — Alain Chau
(74) *Attorney, Agent, or Firm* — Barnes & Thornburg LLP

(57) ABSTRACT

A gas turbine engine system includes an engine component comprising ceramic matrix composite materials, at least one control system configured to control at least a temperature of the engine component, and a controller. The controller includes a degradation map stored therein. The degradation map includes degradation fields, each field defined by a unique range of temperatures and stresses of the component and correlated to different types of degradation of the component. The controller is configured to determine a first temperature and stress of the component and a first field based on the first temperature and stress, determine a second field different from the first and a second temperature and stress that would locate the component in the second field, and instruct the control system to change the temperature of the component from the first to the second temperature to locate the component in the second field.

20 Claims, 4 Drawing Sheets

CMC TEMPERATURE-DEGRADATION MAP

(51) Int. Cl.
*F01D 21/00* (2006.01)
*F01D 5/28* (2006.01)
*F02C 9/54* (2006.01)

(52) U.S. Cl.
CPC .. *F05D 2270/112* (2013.01); *F05D 2270/114* (2013.01); *F05D 2270/303* (2013.01); *F05D 2270/3032* (2013.01); *F05D 2270/331* (2013.01); *F05D 2270/332* (2013.01); *F05D 2270/44* (2013.01); *F05D 2300/6033* (2013.01)

(56) References Cited

U.S. PATENT DOCUMENTS

| | | |
|---|---|---|
| 5,575,616 A | 11/1996 | Hagle et al. |
| 6,481,211 B1 | 11/2002 | Haas |
| 6,823,675 B2 | 11/2004 | Brunell et al. |
| 8,688,245 B2 | 4/2014 | Bacic et al. |
| 8,881,532 B2 | 11/2014 | Bozzi et al. |
| 8,904,753 B2 | 12/2014 | Murphy |
| 9,342,060 B2 | 5/2016 | Fuller et al. |
| 9,581,086 B2 * | 2/2017 | Tiwari ................. G05B 13/024 |
| 9,885,251 B2 | 2/2018 | Lebel et al. |
| 10,267,153 B2 | 4/2019 | Morimoto et al. |
| 10,284,125 B2 | 5/2019 | Armstrong et al. |
| 11,203,983 B2 * | 12/2021 | Takeda ................ F04D 27/0246 |
| 11,293,353 B2 * | 4/2022 | Meisner .................... F01D 5/02 |
| 2004/0000144 A1 * | 1/2004 | Rajamani ................. F02C 9/28 60/39.281 |
| 2007/0245708 A1 * | 10/2007 | Southwick ............... F02C 9/00 60/39.091 |
| 2011/0004388 A1 | 6/2011 | Winter |
| 2013/0325286 A1 | 12/2013 | Lacaille |
| 2014/0125121 A1 | 5/2014 | Edwards et al. |
| 2015/0354465 A1 | 12/2015 | Suciu et al. |
| 2016/0140155 A1 | 5/2016 | Bothier et al. |
| 2017/0114725 A1 | 4/2017 | Holt et al. |
| 2017/0323274 A1 | 11/2017 | Johnson et al. |
| 2018/0135417 A1 * | 5/2018 | Surace ..................... F01D 5/18 |
| 2018/0347474 A1 * | 12/2018 | Meisner ................ F01D 17/085 |
| 2019/0186269 A1 | 6/2019 | Grzelecki et al. |
| 2019/0376408 A1 | 12/2019 | Adibhatla et al. |
| 2020/0277902 A1 * | 9/2020 | Takeda ..................... F02C 9/28 |

* cited by examiner

GAS TURBINE ENGINE OPERATING SCHEDULES FOR OPTIMIZING CERAMIC MATRIX COMPOSITE COMPONENT LIFE

FIELD OF THE DISCLOSURE

The present disclosure relates generally to turbine assemblies adapted for use in gas turbine engines, and more specifically to turbine assemblies that integrate ceramic matrix composite components therein.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength limitations of composite materials.

SUMMARY

The present disclosure may comprise one or more of the following features and combinations thereof.

A gas turbine engine system may include an engine core, at least one control system, and a controller. The engine core may include a first engine component comprising ceramic matrix composite materials. The at least one control system may control a temperature of the first engine component to effect a stress applied to the first engine component. The controller may including a degradation mechanism map stored therein.

In some embodiments, the degradation mechanism map may include a plurality of degradation fields, each of the plurality of degradation fields defined by a unique range of temperatures of the first engine component and a unique range of stresses applied to the first engine component, each of the plurality of degradation fields correlating to different degradation types of the first engine component.

In some embodiments, the controller may determine a first temperature of the first engine component and a first stress applied to the first engine component for a first operating condition of the engine core, and determine a first degradation field of the plurality of degradation fields of the first engine component that is located based on the first temperature and the first stress.

In some embodiments, the controller may determine a second degradation field of the plurality of degradation fields that is different than the first degradation field, and determine a second temperature of the first engine component to cause a second stress to be applied to the first engine component that would locate the first engine component in the second degradation field.

In some embodiments, the controller may generate instructions to cause the at least one control system to change the first temperature of the first engine component to the second temperature to cause the second stress to be applied to the first engine component such that the first engine component is located in the second degradation field such that the first engine component is not located in the first degradation field for longer than a predetermined duration.

In some embodiments, the first temperature is a directly measured temperature of the first engine component and the first stress is a directly measured stress of the first engine component.

In some embodiments, the first temperature is a predicted temperature of the first engine component and the first stress is a predicted stress of the first engine component.

In some embodiments, the controller may generate the degradation mechanism map via at least one of predetermined properties of the first engine component and directly measured properties of the first engine component for at least the first operating condition.

In some embodiments, the controller may determine whether the first engine component being located in first degradation field will cause a first degradation level of the first engine component that exceeds a threshold degradation level of the first engine component, and in response to a determination that the first degradation level will exceed the threshold degradation level, determine the second degradation field.

In some embodiments, the first engine component being located in the second degradation field may cause a second degradation level of the first engine component that does not exceed the threshold degradation level of the first engine component.

In some embodiments, the first degradation level may indicate at least some degradation of the first engine component, and the second degradation level may indicate no degradation of the first engine component.

In some embodiments, the first degradation level may indicate at least some degradation of the first engine component, the second degradation level may indicate at least some degradation of the first engine component, and the first degradation level may be greater than the second degradation level.

In some embodiments, the gas turbine engine system may be used in at least one gas turbine engine of an aircraft, and the at least one control system may include at least one of a turbine cooling flow system of the at least one gas turbine engine, at least one fuel metering valve of the at least one gas turbine engine, at least one variable stator vane of the at least one gas turbine engine, at least one environmental control system of the aircraft, and an autopilot system of the aircraft.

In some embodiments, the gas turbine engine system may include a second component. The controller may determine a third temperature of the second engine component and a third stress applied to the second engine component for the first operating condition of the engine core, and determine a third degradation field of the plurality of degradation fields of the second engine component that is located based on the third temperature and the third stress.

In some embodiments, the controller may determine a fourth degradation field of the plurality of degradation fields that is different than the third degradation field, and determine a fourth temperature of the second engine component to cause a fourth stress to be applied to the second engine component that would locate the second engine component in the fourth degradation field.

In some embodiments, the controller may generate instructions to cause the at least one control system to change the third temperature of the second engine component to the fourth temperature to cause the fourth stress to be applied to the second engine component such that the second engine component is located in the fourth degradation field such that the second engine component is not located in the third degradation field for longer than a second predetermined duration.

In some embodiments, the third degradation field may be the same as the first degradation field and the fourth degradation field may be the same as the second degradation field, or the third degradation field may be the same as the first degradation field and the fourth degradation field may be different than the second degradation field, or the third degradation field may be different than the first degradation field and the fourth degradation field may be the same as the second degradation field, or the third degradation field may be different than the first degradation field and the fourth degradation field may be different than the second degradation field.

According to another aspect of the present disclosure, a gas turbine engine system may include a controller. The controller may include a degradation mechanism map for a first engine component of an engine core of the gas turbine engine system stored therein, the degradation mechanism map including a plurality of degradation fields.

In some embodiments, the controller may determine a first degradation field of the plurality of degradation fields of the first engine component, and determine a second degradation field of the plurality of degradation fields that is different than the first degradation field.

In some embodiments, the controller may generate instructions to cause at least one control system of the gas turbine engine system to change at least one parameter of the first engine component such that the first engine component is moved to the second degradation field.

In some embodiments, the at least one parameter may be a water vapor level and/or a pressure of at least one portion of the engine core.

In some embodiments, each of the plurality of degradation fields may be defined by a unique range of temperatures of the first engine component and a unique range of stresses applied to the first engine component.

In some embodiments, the controller may determine a first temperature of the first engine component and a first stress applied to the first engine component for a first operating condition of the engine core.

In some embodiments, the determining of the first degradation field by the controller may be located based on the first temperature and the first stress.

In some embodiments, the controller may determine a second temperature of the first engine component to cause a second stress to be applied to the first engine component that would locate the first engine component in the second degradation field.

In some embodiments, the change of the at least one parameter of the first engine component may achieve the second temperature to cause the second stress to be applied to the first engine component such that the first engine component moves to the second degradation field.

In some embodiments, the controller may determine whether the first engine component being located in first degradation field will cause a first degradation level of the first engine component that exceeds a threshold degradation level of the first engine component, and in response to a determination that the first degradation level will exceed the threshold degradation level, determine the second degradation field.

In some embodiments, the first engine component being located in the second degradation field may cause a second degradation level of the first engine component that does not exceed the threshold degradation level of the first engine component.

In some embodiments, the first degradation level may indicate at least some degradation of the first engine component, and the second degradation level may indicate no degradation of the first engine component.

In some embodiments, the first degradation level may indicate at least some degradation of the first engine component, the second degradation level may indicate at least some degradation of the first engine component, and the first degradation level may be greater than the second degradation level.

According to another aspect of the present disclosure, a method of managing degradation of an engine component of an engine core of a gas turbine engine may include several steps. In some embodiments, the engine component may comprise ceramic matrix composite materials. The method may include determining a first temperature of the engine component and a first stress applied to the engine component for a first operating condition of the engine core, and determining a first degradation field of a plurality of degradation fields of a degradation mechanism map of the engine component that is located based on the first temperature and the first stress, each of the plurality of degradation fields defined by a unique range of temperatures of the engine component and a unique range of stresses applied to the engine component, each of the plurality of degradation fields correlating to different degradation types of the engine component.

In some embodiments, the method may include determining a second degradation field of the plurality of degradation fields that is different than the first degradation field, and determining a second temperature of the engine component to cause a second stress to be applied to the engine component that would locate the engine component in the second degradation field.

In some embodiments, the method may include generating instructions, via a controller, to cause at least one control system of the gas turbine engine to change the first temperature of the engine component to the second temperature to cause the second stress to be applied to the engine component such that the engine component is located in the second degradation field such that the engine component is not located in the first degradation field for longer than a predetermined duration, the at least one control system configured to control at least a temperature of the engine component to effect a stress applied to the engine component.

These and other features of the present disclosure will become more apparent from the following description of the illustrative embodiments.

DETAILED DESCRIPTION OF THE DRAWINGS

Figure 1:
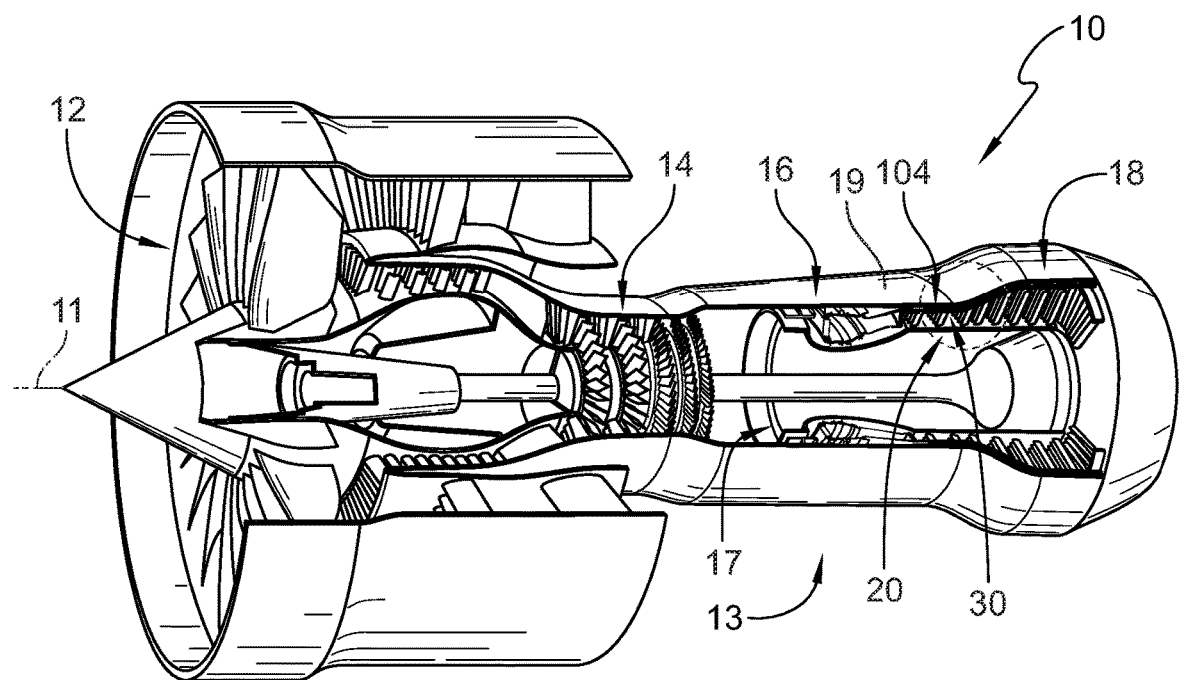
FIG. 1 is a cut-away perspective view of a gas turbine engine showing a fan driven by an engine core having a compressor, a combustor, a turbine, a plurality of stator vane assemblies and a plurality of turbine wheel assemblies, the gas turbine engine including ceramic matrix composite components in the stator vane assemblies, the blade track shrouds surrounding the turbine wheel assemblies, the combustor liner, and other high-temperature areas.

For the purposes of promoting an understanding of the principles of the disclosure, reference will now be made to a number of illustrative embodiments illustrated in the drawings and specific language will be used to describe the same.

Figure 2:
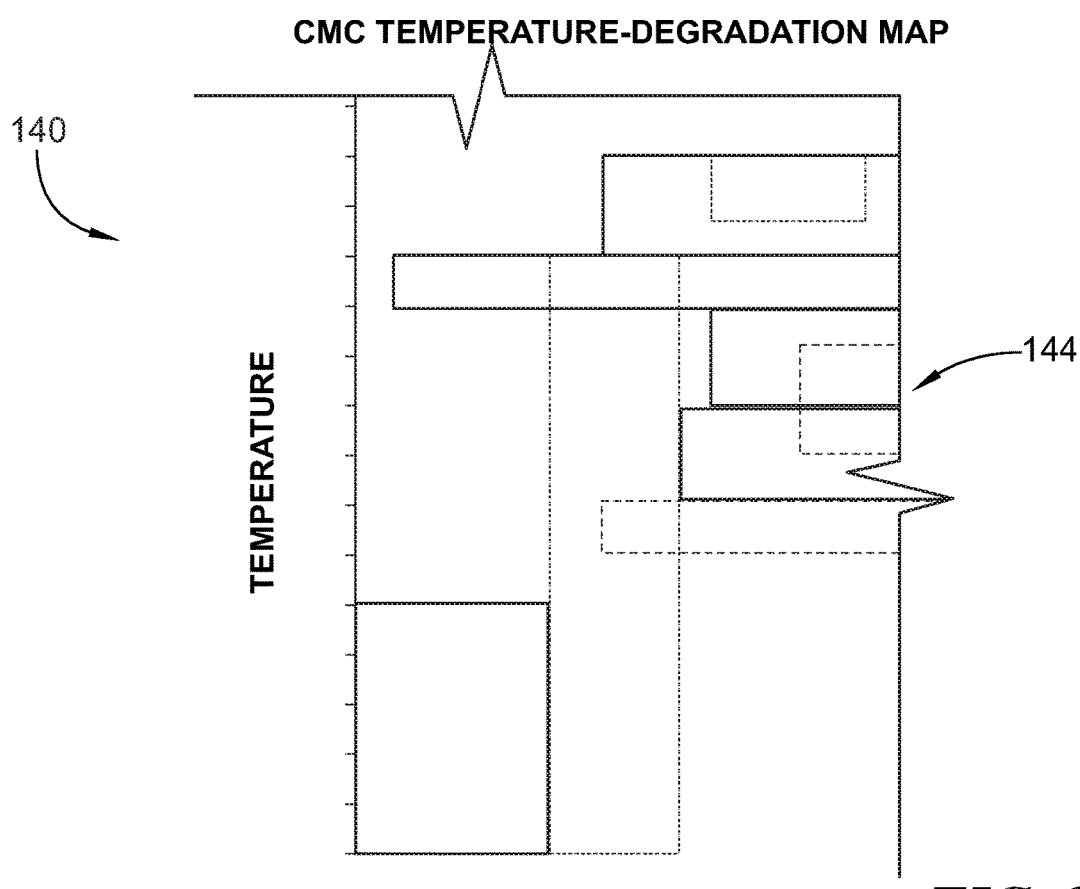
FIG. 2 is a graphical representation of a degradation mechanism map of a controller of the gas turbine engine of FIG. 1 showing a plurality of degradation fields, where each degradation field is defined by a unique range of temperatures (y-axis) of one of the engine components of the engine core and a unique range of stresses (x-axis) applied to the engine component.
Figure 3:
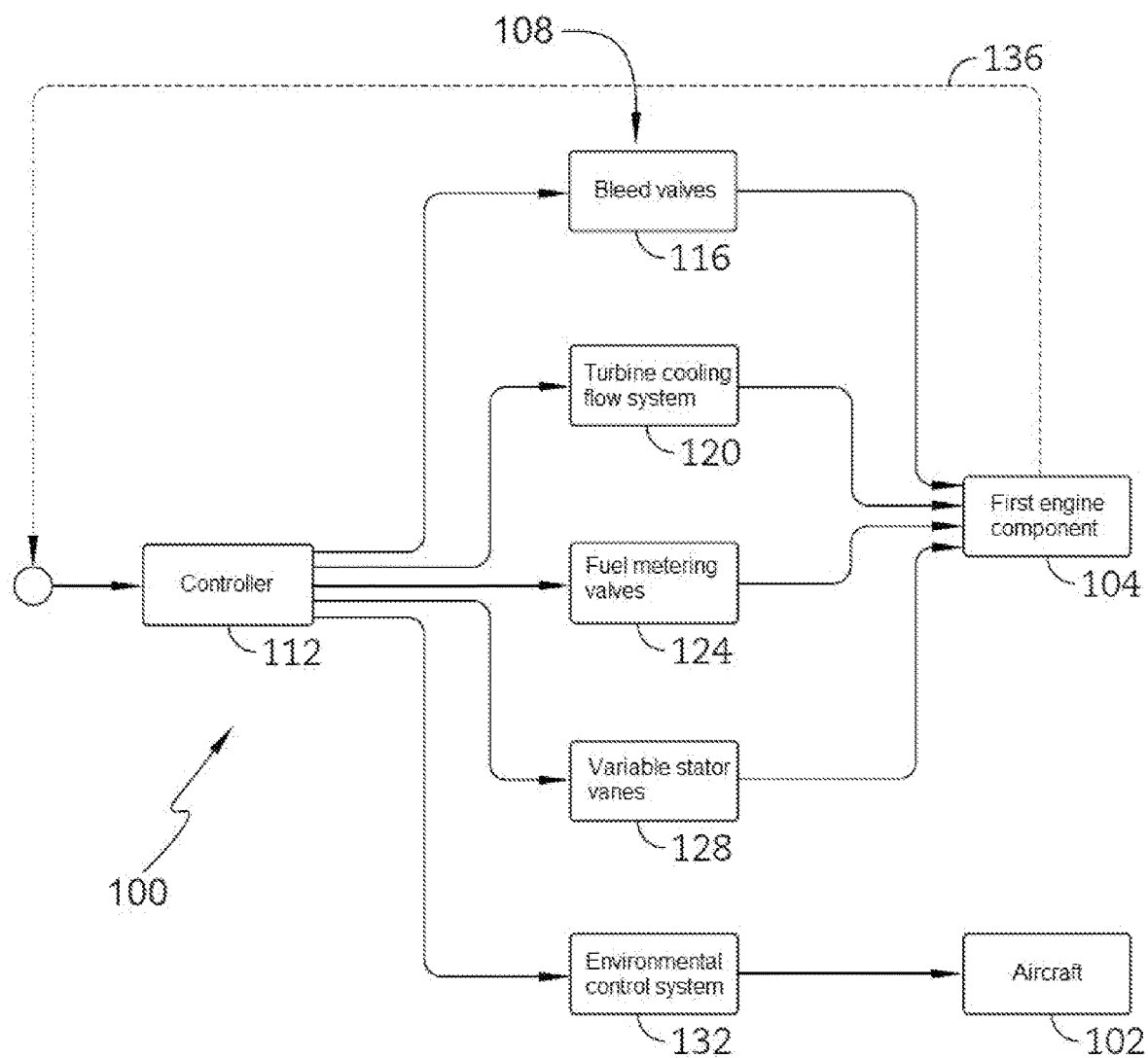
FIG. 3 is a schematic view of a gas turbine engine system of the gas turbine engine of FIG. 1, showing a plurality of control systems that may change at least one parameter of at least the engine component such that the engine component may move between degradation fields of the degradation map.

A gas turbine engine system 100 included in a gas turbine engine 10 is shown in FIGS. 1-4. In the exemplary embodiment, the gas turbine engine system 100 may include an engine core 13 including a first engine component 104 comprising ceramic matrix composite materials. As shown in FIG. 3, the gas turbine engine system 100 may include at least one control system 108 configured to change and/or control at least one parameter of the first engine component 104. In at least one embodiment, the at least one control system 108 may be configured to control a temperature of the first engine component 104 so as to effect a stress applied to the first engine component 104.

The gas turbine engine system 100 may further include a controller 112, as shown in FIG. 2. The controller 112 may include a degradation mechanism map 140 stored in the controller 112. In the exemplary embodiment, the degradation mechanism map 140 may include a plurality of degradation fields 144 that may each correspond to different degradation mechanism regimes of at least the first engine component 104 that have various effects on the first engine component 104, such as damaging the component 104 through different degradation mechanisms. Accordingly, it may be desirable to selectively move the component 104 out of one damaging regime and into a different, less damaging regime so that the component 104 is not subject to one type of degradation mechanism for an extended period. By scheduling the component 104 to change between degradation mechanisms, the life of the component 104 may be extended relative to a component that is not selectively moved between regimes.

As can be seen in FIG. 2, each degradation field 144 is defined by a unique range of temperatures along the y-axis and a unique range of stresses applied to the component 104 along the x-axis. In the present embodiment, the controller 112 may be configured to cause the first engine component 104 to move from a first degradation field to a second degradation field that is different than the first degradation field. To move the first engine component 104 between degradation fields, the controller 112 may be configured to determine a first degradation field that the first engine component 104 is located in and determine a second degradation field that is different than the first degradation field. The controller 112 may then generate instructions to cause the at least one control system 108 to change at least one parameter of the first engine component 104 such that the first engine component 104 moves from the first degradation field to the second degradation field.

The gas turbine engine system 100 is adapted for use in the gas turbine engine 10, which includes a fan 12, a compressor 14, the combustor 16, a turbine 18, and a turbine case 19, as shown in FIG. 1. The compressor 14, the combustor 16, and the turbine 18 may define the engine core 13. The fan 12 is driven by the turbine 18 and provides thrust for propelling an aircraft 102. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 to cause the turbine 18 to rotate about a central axis 11 of the gas turbine engine 10 and drive the compressor 14 and the fan 12.

The turbine 18 includes the turbine case 19, a plurality of rotating turbine wheel assemblies 20, and a plurality of stator vane assemblies 30 that are fixed relative to the central axis 11, as suggested in FIG. 1. The hot gases are conducted through a gas path 17 and interact with the turbine wheel assemblies 20 to cause the turbine wheel assemblies 20 to rotate about the central axis 11. The plurality of stator vane assemblies 30 are positioned so as to direct the gases toward the turbine wheel assemblies 20 at a desired angle.

In at least one embodiment, the engine core 13 includes the first engine component 104 which is comprised of ceramic matrix composite materials. The first engine component 104 may include any engine component located within the engine core 13, such as, but not limited to, combustor liners, blades of the turbine wheel assemblies 20, airfoils of the stator vane assemblies 30, and sealing components of the turbine 18. In other embodiments, the first engine component 104 may include an engine component of the gas turbine engine 10 located outside of the engine core 13 in another portion of the engine 10, such as within the fuel system of the aircraft 102, in the fan 12, and in the case 19.

In the exemplary embodiment, the first engine component 104 may be completely formed from ceramic matrix composite materials. However, it should be appreciated that the first engine component 104 may be comprised of any proportion of ceramic matrix composite materials along with other materials, such as metal, plastics, other types of ceramics, and the like. Regardless of the makeup of the first engine component 104, the controller 112 is capable of moving the first engine component 104 from being located in a first degradation field to a second degradation field that is different than the first degradation field, as will be discussed in detail below.

Routine gas turbine engine 10 operation may cause the first engine component 104 to experience a variety of harmful effects. For example, during normal operation of the engine 10, the hot gases flowing along the gas path 17 may cause engine components of the gas turbine engine 10, including the first engine component 104, to experience significant thermal cycling. During thermal cycling, the engine components experience alternating periods of rapid heating and cooling. Due to the rapid expansion and contraction of the components, engine components, especially those comprising ceramic matrix composite materials, may be damaged. Specifically, with regard to ceramic matrix composite components, the components may experience thermal gradient induced cracking due to spatial thermal gradients induced by transients.

The operation of the engine can affect the integrity of the ceramic matrix composite engine components via additional mechanisms besides thermal cycling. For example, variations in the altitude and nose pitch of the aircraft 102, variations in the fuel mixture, and variations in the gas velocity flowing through the engine core 13 can have significant effects on the ceramic matrix composite engine components, some of which negatively impact the integrity of the components.

In order to mitigate damage and/or degradation of ceramic matrix composite components of the engine 10 during engine operation, the aircraft 102 and/or the engine 10 may utilize the gas turbine engine system 100 discussed above. The gas turbine engine system 100 may be configured to control and/or actuate engine control systems 108 that are capable of influencing various operating aspects of the gas turbine engine 10, such as temperature, fuel mixtures, gas velocity, and others, in order to minimize damage caused to the ceramic matrix composite components.

As shown in FIG. 3, the gas turbine engine system 100 may include a controller 112 that is configured to control at least one control system 108 of the engine. In at least some embodiments, the controller 112 may be implemented in the aircraft 102 as software programmed for a corresponding hardware component that is included in the avionics of the aircraft 102. The controller 112 may also be implemented aboard the aircraft 102 in a computer, a processor, a control module, a programmable hardware component, or the like. In the exemplary embodiment, the controller 112 may be configured to operate in an automated mode in which the controller 112 automatically performs the functions discussed below in order to mitigate degradation of the ceramic matrix composite components of the engine. The controller 112 may also operate in a manual mode in which a user of the system 100 may selectively operate the controller 112 in order to mitigate degradation of the engine components.

The at least one control system 108 includes bleed valves 116, a turbine cooling flow system 120, fuel metering valves 124, variable stator vanes 128, and an environmental control system 132, as suggested in FIG. 3. It should be understood that the systems discussed herein are not limiting to the number or types of aircraft systems that may potentially influence the integrity of the ceramic matrix composite engine components. Other systems of the aircraft 102 may be controlled by the controller 112 along with or in lieu of the systems discussed above in order to influence the operation of the gas turbine engine 10.

Figures 4, 5:
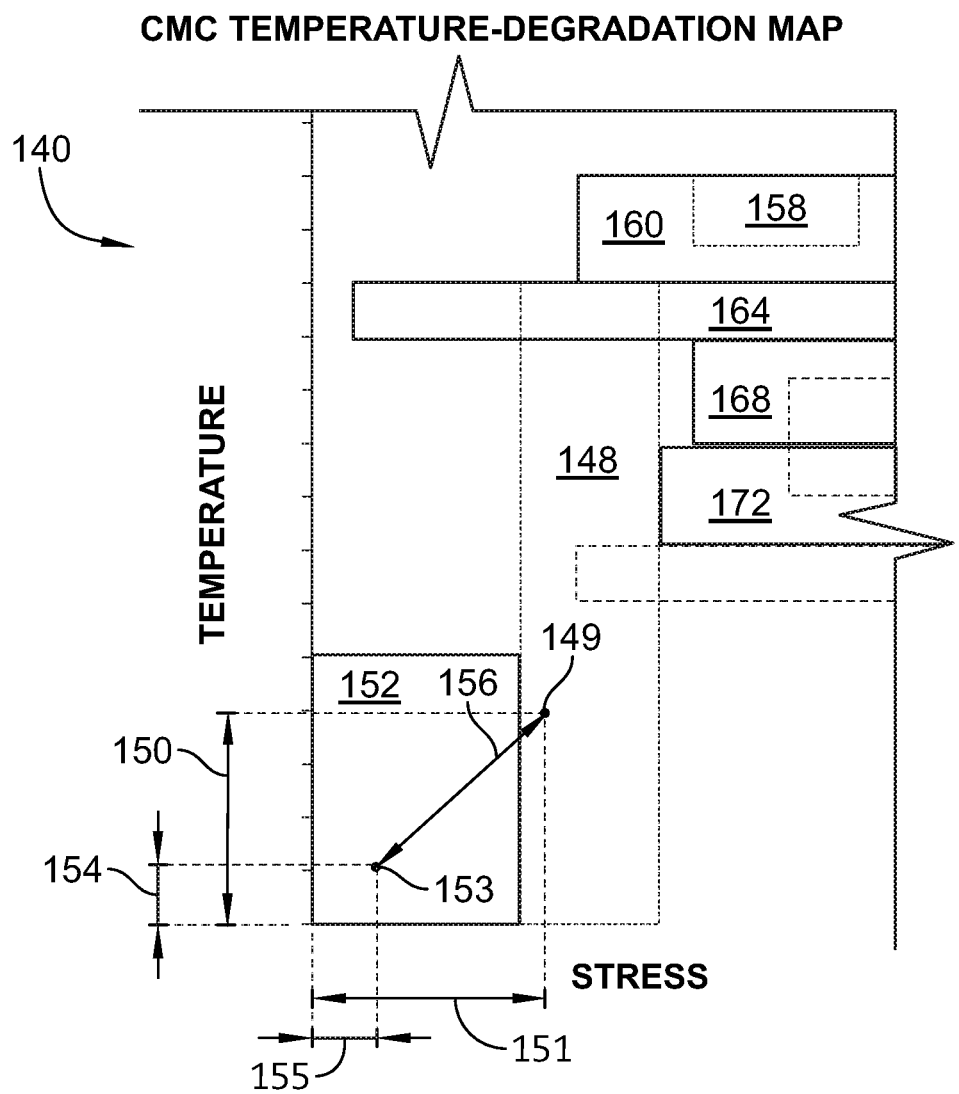
FIG. 4 is a graphical representation of the degradation mechanism map of FIG. 2 showing exemplary degradation fields and suggesting that the first engine component may be moved between degradation fields as a result of varying the control systems according to optimization schedules to maximize the life of the engine component.
FIG. 5 is a graphical representation of exemplary operating conditions of the engine component for a number of different flight schedules of the gas turbine engine of FIG. 1 and showing a range of temperatures (y-axis) of the first engine component over a duration (x-axis) of flight time of an aircraft including the gas turbine engine, where the graphical representation shows a long duration flight, a short duration flight, and a degradation field of the first engine component.

In order to determine the current and/or potential effect that the operation of the gas turbine engine 10 is having or will have on the ceramic matrix composite engine components, in particular the first engine component 104, the controller 112 includes a degradation mechanism map 140, as shown in FIGS. 2 and 4. The degradation mechanism map 140 is stored in the controller 112, for example, on a readable memory medium.

As can be seen in FIGS. 2 and 4, the degradation mechanism map 140 may include a plurality of degradation fields 144 that each correspond to a different degradation mechanism regime of at least the first engine component 104. Each regime may have various effects on the first engine component 104. For example, one regime may correspond to increased matrix cracking and fiber breakage, while another regime may correspond to fiber strength degradation due to creep.

In some embodiments, the degradation mechanism map 140 may correspond to only a single engine component, such as the first engine component 104. However, in other embodiments, the degradation mechanism map 140 may include information regarding a variety of engine components. For example, a degradation mechanism map 140 may be generated that includes degradation fields 144 that correspond to a plurality of engine components that all exhibit similar reactions to operating aspects of the engine, and thus can be simultaneously influenced by the same control systems 108. In other embodiments, multiple degradation mechanism maps 140 may be stored in the controller 112 corresponding to multiple engine components, and each degradation mechanism map 140 may be individually accessed by the controller 112 in order to mitigate degradation of that specific ceramic matrix composite component.

In at least one embodiment, the degradation mechanism map 140 may be generated via predetermined properties of the ceramic matrix composite engine component 104. For example, properties regarding how the first engine component 104 reacts to certain external influences during engine operation may be utilized in generating the degradation mechanism map 140. In this embodiment, the degradation mechanism map 140 is preloaded into the controller 112.

In other embodiments, the degradation mechanism map 140 may be generated by the controller 112 based on properties of the first engine component 104 during operation of the engine 10. In this case, the controller 112 may utilize real-time data regarding the first engine component 104 to generate the degradation fields 144, and constantly update the bounds of the degradation fields 144 in order to provide a real-time degradation mechanism map 140 of the first engine component 104 during flight.

As can be seen in FIG. 4, the plurality of degradation fields 144 of the degradation mechanism map 140 may include numerous fields, some of which overlap and some which do not. For example, the degradation fields 144 may include a "matrix cracking stress" field 148, a "no significant degradation" field 152, a "matrix cracking and fiber breakage" field 158, a "fiber creep" field 160, a "fiber strength degradation due to creep" field 164, a "matrix cracking and internal oxidation causing strong fiber bonding and embrittlement" field 168, and a "failure controlled by fiber rupture properties" field 172. It should be appreciated that other embodiments of the gas turbine engine system 100 may include alternative or additional fields 144 that correspond to damaging mechanism regimes that are different than those shown in FIG. 4.

As can be seen in FIGS. 2 and 4, each degradation field 144 is bound by a unique range of temperatures (y-axis) and stresses (x-axis) applied to the first engine component 104. The boundaries of these degradation fields 144 may be different for other types of degradation mechanism regimes in other embodiments. For example, more variables may be included that together define an active degradation map, such as temperature, stress, partial pressure, water vapor, $NaSo_4$ concentration, and gas velocity.

In the exemplary embodiment, the first engine component 104 may be located within a first degradation field 144 of the plurality of degradation fields 144 on the degradation map 140 during an operating condition of the engine 10, as shown in FIGS. 2 and 4. The location of the first engine component 104 on the map 140 is determined as a function of the temperature of the component 104 and the stress applied to the component 104 for the operating condition of the engine 10. The temperature of the component 104 directly affects degradation of the component 104, as well as affecting the stress applied to the component 104. The stress applied to the component 104 is affected by factors other than temperature as well.

By way of example, at a certain operating condition the engine 10, the first engine component 104 may be located at point 149 within the "matrix cracking stress" field 148, as shown in FIG. 4, based on a temperature of the component 104 and a stress applied to the component 104. As a result, at this point of the engine 10 operation, the first engine component 104 may be susceptible to cracking of the matrix of the ceramic matrix composite material. Accordingly, it would be desirable to move the first engine component 104 from this field to a more favorable field, such as the "no significant degradation" field 152.

The operating condition of the engine as disclosed herein refers to a particular condition in which the engine is operating and the various parameters associated with this particular condition. By way of example, a takeoff maneuver of an aircraft may correspond to an operating condition of the engine, in which many of the parameters affecting the engine, such as near maximum thrust, increased temperatures, and increased stress is imposed on the engine components. As another example, a high altitude cruising time period may correspond to an operating condition of the engine, in which the demand placed on the engine by the aircraft is lower, or in other embodiments, could be the worst condition for certain degradation mechanisms.

In order to transfer the first engine component 104 to another field of the map, the controller 112 may control at least one control system 108 of the engine, which in turn will affect the temperature and stress of the component 104 in order to alter the degradation field the component 104 is located in. For example, the temperature of the first engine component 104 may be varied by adjusting the turbine cooling flow system 120. The turbine cooling flow system 120 may either cool the component 104 or allow the component 104 to heat up, depending on which would most efficiently mitigate degradation of the ceramic matrix composite material of the component 104, or in other words, move the component 104 from a damaging field 144 to a less damaging field 144. It should be appreciated that other parameters of the engine component 104 besides temperature may be controlled by this and other control systems 108 in order to mitigate degradation, which will be discussed in detail further below. For example, the turbine cooling flow system 120 may be configured to control mass flow rate, static pressure, temperature by actuating a heat exchanger or heater, and independent cooling features of the engine.

Typically, if a component's temperature is adjusted in an engine, the component is cooled. Cooling of the component 104 may be used to change the regime of the component 104. Even still, in some cases, the controller 112 generates instructions to cause the component 104 to be subject to increased temperatures for the given engine operating condition to move the component 104 to a different regime. For example, cooling air to the component may be reduced or additional fuel used.

In the exemplary embodiment, the controller 112 may be configured to control the at least one control system 108 so that the control system 108 changes the temperature of the first engine component 104. The controller 112 may be configured to first determine a first temperature 150 of the first engine component 104 and a first stress 151 applied to first engine component 104 based on the first temperature 150 for a first operating condition of the engine core 13 of the engine 10. After determining the intersection point 149 of the first temperature 150 and the first stress 151, the controller 112 may be configured to determine a first degradation field 144 ("matrix cracking stress" field 148 as illustrated in the example shown in FIG. 4) that the first engine component 104 is located in based on the first temperature 150 and the first stress 151.

The controller 112 may be further configured to determine whether it would be desirable to move the first engine component 104 out of the first degradation field 144. In order to determine this, the controller 112 refers to the degradation mechanism map 140 and the properties associated with the field 144 in which the engine component 104 is located to ascertain whether the damage to the component 104 can be mitigated by moving the component 104 out of that field 144. The controller 112 may further consider the amount of time the component 104 has spent in one or more regimes and the amount of time the component 104 could spend in those or other regimes and the resulting degradation that would occur. In the exemplary embodiment, the controller 112 would recognize that the "matrix cracking stress" field 148 is an undesirable field, as prolonged exposure of the ceramic matrix composite component 104 to the effects that occur while in this field may cause cracking in the matrix of the materials of the component 104. As such, the controller 112 determines that it would be desirable to move the first engine component 104 to a second degradation field 144 in order to mitigate degradation of the component 104. Alternatively, the controller 112 may determine that the field 148 was previously acceptable, but, after some amount of time in that field during a single or multiple flights, further exposure to the field 148 would cause more degradation than moving the component 104 to a different field.

Accordingly, the controller 112 is further configured to determine a second degradation field 144 that is different from the first degradation field. In the exemplary embodiment shown in FIG. 4, the controller 112 determines that the "no significant degradation mechanisms" field 152 would mitigate degradation of the component 104. In other embodiments, the controller 112 may determine that other fields may mitigate degradation more efficiently than the field 152 of FIG. 4 or that some fields can be achieved for the operating condition of the engine 10 while others cannot be achieved. For example, during certain operating conditions of the engine 10, it may not be possible to move the first engine component 104 into the "no significant degradation mechanisms" field 152 effectively. The controller 112 may be configured to recognize that the first engine component 104 is in such a scenario, and accordingly, based on the properties of the first engine component 104, may be further configured to ascertain which degradation field 144 would be most ideal for the component 104 in order to minimize degradation.

In the exemplary embodiment, after determining the second degradation field 144 to move the first engine component 104 to, the controller 112 is configured to determine a second temperature 154 of the first engine component 104 to cause a second stress 155 and the second temperature 154 to be applied to the component 104 that would locate the component 104 in the second degradation field ("no significant degradation mechanisms" field 152, and point 153, as shown in FIG. 4). Having determined the information regarding the first and second temperatures, the first and second stresses, and the first and second degradation fields, the controller 112 is configured to then control the at least one control system 108, for example via generating instructions to send to a controller or actuator of the control system 108, such that the control system 108, in some manner, changes the temperature of the first engine component 104 from the first temperature 150 to the second temperature 154 such that the second stress 155 is applied to the component 104 as well. As a result, the component 104 will have moved into the second degradation field, in this case the "no significant degradation mechanisms" field 152, thereby mitigating damage and/or degradation to the component 104.

In some embodiments, the controller 112 may be configured to avoid certain degradation fields 144 entirely. For example, intermediate temperatures (approximately 900 degrees F. to 1700 degrees F.) may be particularly damaging for ceramic matrix composite components comprising silicon carbide due to active internal embrittlement mechanisms without sufficient kinetics to enable the formation of a protective surface oxide scale. Accordingly, the controller 112 may be configured to cause the component 104 to avoid such ranges (of temperatures, stresses, pressures, etc.) for as long as possible, or entirely if possible by lowering or increasing a temperature of the component 104 to a point outside of the intermediate range. Degradation in ceramics does not follow an Arrhenius relationship over the full operating temperature range. The most damaging condition may be at an intermediate temperature. In contrast, metallic components are not subject to all of the degradation mechanisms that ceramic matrix composite materials are such that typical metallic components would not be cooled or heated to avoid such a range of temperatures. Moreover, metallic components may suffer corrosion-fatigue related degradation that can be exacerbated at intermediate temperatures, or hot corrosion in general.

In the exemplary embodiment, the gas turbine engine system 100 may further include a feedback loop 136, as shown in FIG. 3. In one embodiment, the feedback loop 136 may provide direct feedback, or in other words, measurements may be taken of the engine component 104 to ascertain, for example, the material temperature and stresses at discrete locations on the component 104. Other parameters of the component 104, such as pressure, may be measured in order to ascertain an accurate readout of the state of the component 104. Measurements may be taken from many components to acquire an accurate readout of the component 104 or a plurality of components. After these measurements are taken, the controller 112 may be configured to ascertain a predicted damage or degradation of the component 104 or components. The controller 112 may be further configured to update the degradation mechanism map 140 and/or the degradation fields 144 accordingly.

In other embodiments, the feedback loop 136 may be an indirect feedback loop in which predetermined and already known properties of the engine component 104 or plurality of components are taken into account by the controller 112 in order to ascertain predicted degradation and update the degradation mechanism map 140. The controller 112 may also be configured to simulate current or future operating conditions of the engine 10 in order to accurately ascertain operating parameters of the component 104 or components without the need to take direct measurements of the component 104 or components.

The controller 112 may also be configured to utilize both direct measurements and already known properties of the component 104 or components to predict degradation. For example, in determining the first temperature and the first stress of the first engine component 104, as discussed above, the controller 112 may utilize an expected temperature and stress of the component 104 in a certain operating condition of the engine 10 to predict which degradation field 144 the component 104 is located in. Thermo-mechanical analysis of the component 104, or assessment of an analysis surrogate model of the component 104, may also be performed by the controller 112 or by, for example, an external software application, to determine which areas or components are most at risk for damage or degradation.

The controller 112 may be further configured to compare the information provided by the direct or indirect feedback loop 136 with standardized data in order to establish a confidence level in the determination to move the component 104 from one degradation field 144 to another field 144. The feedback loop 136 may also be useful for the controller 112 in ascertaining which degradation field 144 would be most ideal for the component 104 in order to minimize degradation in more complicated scenarios where the component cannot simply be moved to the "no significant degradation mechanisms" field 152.

Additionally, in some embodiments, the controller 112 may be configured to use information from the feedback loop 136 to generate a predetermined amount of time that the first engine component 104 may dwell in a particular degradation field 144. The predetermined amount of time may be equal to a maximum time before damage or degradation begins to occur. However, in other embodiments, the predetermined amount of time may be more or less than this maximum time. For example, in some embodiments, it may be desirable to allow the component 104 to dwell in a degradation field 144 and take damage in order to avoid moving to a more damaging degradation field 144. Or, in other embodiments, it may be desirable to move the component 104 to a different degradation field 144 well before any degradation would occur in order to preemptively avoid degradation or damage in the new degradation field 144. The predetermined duration may also be preset by a user in other embodiments.

It should be noted that in embodiments which adjust the temperature of components in order to mitigate component degradation, various measures can be implemented in order to more efficiently adjust the temperature of the components. For example, ceramic matrix composite components typically include significant thermal gradients within the components. As such, one region of the component may be more affected by being located in a degradation field 144 than another region of the component. Furthermore, different regions of the component may be located in different degradation fields 144 during different points of the flight cycle. As such, various measures may be implemented to account for these factors, such as targeted cooling of specific areas of ceramic matrix composite components that are most at risk to damage or degradation. Actuation of different cooling features could also be utilized, for example discrete cooling features such as feeding the airfoil leading edge impingement from a different discrete pipe source that could include a valve that can be independently controlled relative to other cooling features.

FIG. 5 shows a graphical representation 200 of avoiding damaging temperature regimes by altering the temperature of ceramic matrix composite components. FIG. 5 shows a graph including temperature of ceramic matrix composite components (y-axis) versus flight time (x-axis) for two different flight profiles 210, 220. A damaging regime 230 is shown at a certain temperature range and extends along the entirety of the flight duration. During a long duration flight 210, the temperature of a particular engine component, such as the first engine component 104, will increase to a maximum temperature during maximum takeoff conditions of the aircraft 102 and then may decrease over the course of the flight, as shown in FIG. 5. When the temperature of the component 104 approaches the damaging regime 230, the controller 112 may be configured to induce a small increase 240 in temperature of the component 104 to avoid the damaging regime 230. During a short duration flight 220, the temperature of the component 104 may dwell near the damaging regime 230 for longer than during a long duration flight 210. Thus, it may be desirable in such a scenario for the controller 112 to reduce the temperature of the component 104 to avoid the damaging regime 230, as opposed to increasing the temperature multiple times over the course of the flight.

In at least some embodiments, the controller 112 may be further configured to attribute weightings to the various control systems 108. In particular, the controller 112 may be configured to take the information provided by the direct or indirect feedback loop 136, or information already known regarding the engine components, and assess which control systems 108 will be most effective for mitigating the damage or degradation of the component 104. The controller 112 may also rank the control systems 108 so as to enable the controller 112 to quickly actuate particular systems 108 when immediate adjustment of the operating parameters of the component 104 is required. For example, if it is determined by the controller 112 that the turbine cooling flow system 120 would have the largest effect on mitigating damage or degradation to the engine component, the turbine cooling flow system 120 will be attributed the largest weighting.

In at least some embodiments, the weightings may be required to change throughout the duration of the flight due to changes in operating conditions of the aircraft 102 and the engine 10. Accordingly, the controller 112 may be configured to dynamically assess the weightings using data from the feedback loop 136 in order to seek the least damaging state of the components at all times throughout the flight.

In some embodiments, the controller 112 may be configured to operate during a dedicated ceramic matrix composite component life improvement time frame during the duration of the flight, as opposed to dynamically monitoring and mitigating damage to the components, as discussed above. For example, in at least one scenario, the controller 112 may be configured to build a protective surface oxide scale to reduce the rate of degradation of the components. The controller 112 may wait until the engine 10 is operating in low to intermediate temperature ranges (such as, for example, in ranges less than 1700° F.), during which time the controller 112 may actuate at least one control system 108 in order to minimize cooling flows to the engine component 104 while maximizing the gas path 17 temperatures without degrading the supporting components of the engine component 104. Such an operation would need to occur for a short duration, ideally for a maximum time of one to two minutes.

In some embodiments, the controller 112 may be configured to generate instructions to cause at least one control system 108 to vary a pressure and/or water vapor exposure to an engine component. For example, the controller 112 may actuate the environmental control system 132 in order to adjust a pressure, water vapor level, or other similar parameter. The environmental control system 132 may include a cabin bleed system which subtly affects gas path static pressure. As a result, damage or degradation to the engine component 104 may be minimized or avoided entirely. It should be noted that in addition to the environmental control system 132, in some embodiments, the variable stator vanes, the fuel flow, and the handling bleeds may affect gas path static pressure by causing the engine to rematch (adjust shaft speeds) to satisfy the thrust requirement of the engine.

In at least some embodiments, other systems 108 may be controlled by the controller 112, such as an engine control system, the aircraft flight plan (for example, to avoid weather conditions that would increase or decrease pressure and water vapor levels), and the autopilot system (for example, varying aircraft speed and altitude), in order to minimize the time that the component 104 is in the most damaging conditions. For example, in one scenario, the controller 112 may be configured to adjust the flight plan and the autopilot systems 108 in order to pass through a high humidity area quickly and thus minimize exposure to moisture. As another example, static pressure could be manipulated by the controller 112 when the water vapor partial pressure is already low, i.e., during cruising conditions, in order to further reduce the water vapor partial pressure and to suppress silicon carbide recession rates for a given temperature.

It should be noted that the adjustments of the operating aspects of the engine as described above are managed by the controller 112 so as to not affect the thrust output of the engine 10. Accordingly, the controller 112 is configured to balance the needs of the ceramic matrix composite components with the needs of the engine 10 thrust output. Similarly, fuel consumption of the aircraft 102 may be slightly affected by the operation of the gas turbine engine system 100, but the controller 112 is configured to manage the effects such that aircraft flight range is not compromised. For example, the controller 112 may be configured to increase fuel consumption more aggressively for the sake of increasing the life of the ceramic matrix composite materials during short engine profile elements (such as takeoff or climbing), and increase fuel consumption less aggressively during long flight periods (such as cruising).

It should also be noted that as the engine components degrade, the gas turbine engine 10 temperature is likely to increase in order to meet given thrust requirements. As a result, for a given stress state for a component at a given pressure, the component will have a tendency to move up the y-axis of the degradation mechanism map 140.

It can be envisioned that the gas turbine engine system 100 discussed herein may be utilized for engine components comprising materials other than ceramic matrix composite materials. For example, the controller 112 of the system 100 may be configured to ascertain damaging conditions for other types of ceramics, plastics, and other materials included in the components of the engines 10, and prepare similar degradation mechanism maps as discussed above and mitigate damage or degradation of these components.

For example, damage to Type I or Type II hot corrosion in nickel based superalloys may be mitigated with the gas turbine engine system 100.

Figure 6:
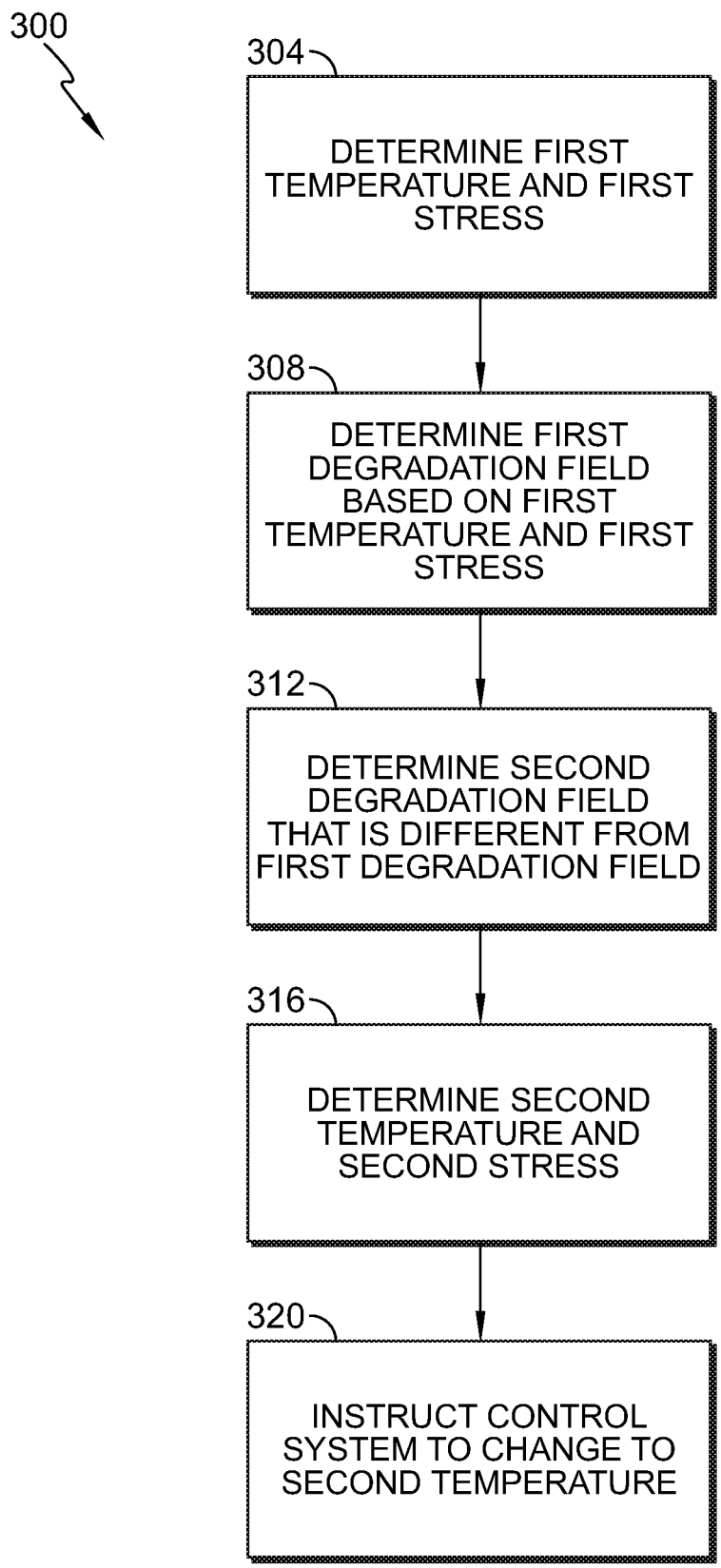
FIG. 6 is a flow diagram of a method for a gas turbine engine system as disclosed herein.

A method 300 of operating the gas turbine engine system 100 discussed above is shown in FIG. 6. The method 300 includes a first step 304 of determining a first temperature of the first engine component 104 and a first stress applied to the first engine component for a first operating condition of the engine core 13. A second step 308 includes determining a first degradation field of the plurality of degradation fields of the first engine component 104 that is located based on the first temperature and the first stress. A third step 312 includes determining a second degradation field of the plurality of degradation fields that is different than the first degradation field. The second degradation field may be a less hazardous degradation field such that damage to the component 104 is mitigated.

A fifth step 316 includes determining a second temperature of the first engine component 104 to cause a second stress to be applied to the first engine component 104 that would locate the first engine component 104 in the second degradation field. A sixth step 320 includes instructing the at least one control system 108 to change the first temperature of the first engine component 104 to the second temperature to cause the second stress to be applied to the first engine component 104 such that the first engine component 104 is located in the second degradation field such that the first engine component 104 is not located in the first degradation field for longer than a predetermined duration.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine system comprising
   an engine core including a first engine component comprising ceramic matrix composite materials,
   at least one control system configured to control a temperature of the first engine component to effect a stress applied to the first engine component, and
   a controller including a degradation mechanism map stored therein, the degradation mechanism map comprising a plot of stress of the first engine component versus temperature of the first engine component, the degradation mechanism map including a plurality of degradation fields, each of the plurality of degradation fields defined by a unique range of temperatures of the first engine component and a unique range of stresses applied to the first engine component, each of the plurality of degradation fields correlating to different degradation types of the first engine component, and the controller configured to
   determine the first engine component is operating at a first predetermined temperature,
   determine a first degradation field of the plurality of degradation fields of the first engine component that is located on the degradation mechanism map based on the first predetermined temperature and a first stress of the first engine component caused by the first engine component operating at the first predetermined temperature,
   determine a second degradation field of the plurality of degradation fields that is different than the first degradation field, the second degradation field being located based on a second predetermined temperature and a second stress of the first engine component caused by the first engine component operating at the second predetermined temperature that would locate the first engine component in the second degradation field, and
   generate instructions to cause the at least one control system to change the temperature of the first engine component from the first predetermined temperature to the second predetermined temperature to cause the second stress to be applied to the first engine component such that the first engine component is located in the second degradation field such that the first engine component is not located in the first degradation field for longer than a predetermined duration.

2. The gas turbine engine system of claim 1, wherein the first predetermined temperature includes a predicted temperature of the first engine component and the first stress is a predicted stress of the first engine component.

3. The gas turbine engine system of claim 1, wherein the first and second predetermined temperatures are based on predetermined properties of the first engine component, and wherein the controller is further configured to generate the degradation mechanism map via directly measured properties of the first engine component for at least the first operating condition.

4. The gas turbine engine system of claim 1, wherein
   the controller is further configured to
      determine whether the first engine component being located in first degradation field will cause a first degradation level of the first engine component that exceeds a threshold degradation level of the first engine component, and
      in response to a determination that the first degradation level will exceed the threshold degradation level, determine the second degradation field, and
   the first engine component being located in the second degradation field causes a second degradation level of the first engine component that does not exceed the threshold degradation level of the first engine component.

5. The gas turbine engine system of claim 4, wherein
   the first degradation level indicates at least some degradation of the first engine component, and
   the second degradation level indicates no degradation of the first engine component.

6. The gas turbine engine system of claim 4, wherein
   the first degradation level indicates at least some degradation of the first engine component,
   the second degradation level indicates at least some degradation of the first engine component, and
   the first degradation level is greater than the second degradation level.

7. The gas turbine engine system of claim 1, wherein
   the gas turbine engine system is configured for use in at least one gas turbine engine of an aircraft, and
   the at least one control system includes at least one of
      a turbine cooling flow system of the at least one gas turbine engine,
      at least one fuel metering valve of the at least one gas turbine engine,
      at least one variable stator vane of the at least one gas turbine engine,
      at least one environmental control system of the aircraft, and
      an autopilot system of the aircraft.

8. The gas turbine engine system of claim 1, further comprising a second component,
wherein the controller is further configured to
determine a third temperature of the second engine component and a third stress applied to the second engine component for the first operating condition of the engine core,
determine a third degradation field of the plurality of degradation fields of the second engine component that is located based on the third temperature and the third stress,
determine a fourth degradation field of the plurality of degradation fields that is different than the third degradation field,
determine a fourth temperature of the second engine component to cause a fourth stress to be applied to the second engine component that would locate the second engine component in the fourth degradation field, and
generate instructions to cause the at least one control system to change the third temperature of the second engine component to the fourth temperature to cause the fourth stress to be applied to the second engine component such that the second engine component is located in the fourth degradation field such that the second engine component is not located in the third degradation field for longer than a second predetermined duration.

9. The gas turbine engine system of claim 8, wherein
the third degradation field is the same as the first degradation field and the fourth degradation field is the same as the second degradation field, or
the third degradation field is the same as the first degradation field and the fourth degradation field is different than the second degradation field, or
the third degradation field is different than the first degradation field and the fourth degradation field is the same as the second degradation field, or
the third degradation field is different than the first degradation field and the fourth degradation field is different than the second degradation field.

10. The gas turbine engine system of claim 8, wherein the third degradation field is different than the first degradation field and the fourth degradation field is different than the second degradation field.

11. The gas turbine engine system of claim 1, wherein the second temperature is greater than the first temperature and the second stress is greater than the first stress.

12. The gas turbine engine system of claim 1, wherein the control system is further configured generate instructions to change the first temperature of the first engine component to the second temperature to cause the second stress to be applied to the first engine component while keeping the first temperature and the second temperature outside of a range of 900° F. to 1700° F.

13. A gas turbine engine system comprising
a controller including a degradation mechanism map for a first engine component of an engine core of the gas turbine engine system stored therein, the degradation mechanism map comprising a plot of stress of the first engine component versus temperature of the first engine component, the degradation mechanism map including a plurality of degradation fields, and the controller configured to:
determine a first temperature of the first engine component and a first stress applied to the first engine component caused by the first temperature for a first operating condition of the engine core,
determine a first degradation field of the plurality of degradation fields of the first engine component based on the first temperature,
determine a first maximum temperature and a first minimum temperature bounding the first degradation field within which a first degradation level will occur based on at least one of predetermined properties of the first engine component or real-time data regarding the first engine component,
determine a second degradation field of the plurality of degradation fields that is different than the first degradation field,
determine a second temperature of the first engine component to cause a second stress to be applied to the first engine component that would locate the first engine component in the second degradation field,
determine a second maximum temperature and a second minimum temperature bounding the second degradation field within which a second degradation level different than the first degradation level will occur based on at least one of predetermined properties of the first engine component or real-time data regarding the first engine component, and
generate instructions to cause at least one control system of the gas turbine engine system to change a temperature of the first engine component from the first temperature to the second temperature so as to cause the second stress to be applied to the first engine component such that the first engine component is moved from the first degradation field to the second degradation field.

14. The gas turbine engine system of claim 13, wherein each of the plurality of degradation fields is defined by a unique range of temperatures of the first engine component and a unique range of stresses applied to the first engine component.

15. The gas turbine engine system of claim 13, wherein the controller is further configured to
determine whether the first engine component being located in first degradation field will cause the first degradation level of the first engine component that exceeds a threshold degradation level of the first engine component, and
in response to a determination that the first degradation level will exceed the threshold degradation level, determine the second degradation field, and
the first engine component being located in the second degradation field causes the second degradation level of the first engine component that does not exceed the threshold degradation level of the first engine component.

16. The gas turbine engine system of claim 15, wherein
the first degradation level indicates at least some degradation of the first engine component, and
the second degradation level indicates no degradation of the first engine component.

17. The gas turbine engine system of claim 15, wherein
the first degradation level indicates at least some degradation of the first engine component,
the second degradation level indicates at least some degradation of the first engine component, and
the first degradation level is greater than the second degradation level.

18. The gas turbine engine system of claim 13, wherein
the first degradation level indicates at least some degradation of the first engine component, the second degradation level indicates at least some degradation of the first engine component, and the first degradation level is greater than the second degradation level.

19. The gas turbine engine system of claim 13, wherein the second temperature is greater than the first temperature and the second stress is greater than the first stress.

20. A method of managing degradation of an engine component of an engine core of a gas turbine engine, the engine component comprising ceramic matrix composite materials, the method comprising determining a first temperature of the engine component and a first stress applied to the engine component for a first operating condition of the engine core, determining a first degradation field of a plurality of degradation fields of a degradation mechanism map of the engine component that is located based on the first temperature and the first stress, each of the plurality of degradation fields defined by a unique range of temperatures of the engine component and a unique range of stresses applied to the engine component, each of the plurality of degradation fields correlating to different degradation types of the engine component, determining a second degradation field of the plurality of degradation fields that is different than the first degradation field, determining a second temperature of the engine component to cause a second stress to be applied to the engine component that would locate the engine component in the second degradation field, and generating instructions, via a controller, to cause at least one control system of the gas turbine engine to change the first temperature of the engine component to the second temperature to cause the second stress to be applied to the engine component such that the engine component is located in the second degradation field such that the engine component is not located in the first degradation field for longer than a predetermined duration, the at least one control system configured to (i) raise a temperature of the engine component from the first temperature to the second temperature to cause the second stress to be applied to the engine component in response to the second temperature being greater than the first temperature, and (ii) lower the temperature of the engine component from the first temperature to the second temperature to cause the second stress to be applied to the engine component in response to the second temperature being less than the first temperature.

* * * * *